(12) United States Patent
Fellows et al.

(10) Patent No.: US 8,579,570 B2
(45) Date of Patent: Nov. 12, 2013

(54) FASTENER ATTACHING A COMPONENT TO A PANEL

(75) Inventors: Jeremy P. Fellows, Lake Orion, MI (US); Michelle Weisgerber, Macomb Township, MI (US)

(73) Assignees: GM Global Technology Operations LLC, Detroit, MI (US); Illinois Tool Works Inc., Glenview, IL (US)

( * ) Notice: Subject to any disclaimer, the term of this patent is extended or adjusted under 35 U.S.C. 154(b) by 214 days.

(21) Appl. No.: 13/208,311

(22) Filed: Aug. 11, 2011

(65) Prior Publication Data

US 2013/0039718 A1 Feb. 14, 2013

(51) Int. Cl.
 *F16B 39/284* (2006.01)
(52) U.S. Cl.
 USPC .................................. 411/112; 411/177
(58) Field of Classification Search
 USPC ............. 411/112, 116, 121–124, 141, 177, 411/508–510
 See application file for complete search history.

(56) References Cited

U.S. PATENT DOCUMENTS

| | | | | |
|---|---|---|---|---|
| 2,727,552 A | * | 12/1955 | Chvesta | 411/112 |
| 4,927,306 A | * | 5/1990 | Sato | 411/182 |
| 6,095,734 A | * | 8/2000 | Postadan et al. | 411/182 |
| 7,496,993 B2 | * | 3/2009 | Kosidlo et al. | 24/295 |
| 2008/0286066 A1 | * | 11/2008 | Paquet | 411/177 |
| 2011/0044782 A1 | * | 2/2011 | Lange et al. | 411/2 |

* cited by examiner

*Primary Examiner* — Gary Estremsky

(57) ABSTRACT

A fastener includes an insert mounted in an oversized elongated aperture of a metal panel. The insert has a tubular body of lesser outside dimension than the aperture, and a hollow interior receiving a threaded stud projecting from the component. The tubular body has a flexible lip engaging the panel and first and second retaining fingers having first shoulders engaging the bottom surface of the panel and second shoulders engaging with opposed parallel extending sidewalls of the aperture to prevent rotation of the tubular body. First and second biasing fingers project from the tubular body to engage opposed curved end walls of the aperture to a bias the tubular body within the aperture as allowed by sliding of the second shoulders along the opposed parallel extending sidewalls. A plurality of ratchet fingers extends into the hollow interior to engage the stud when the stud is installed into the insert.

15 Claims, 4 Drawing Sheets

FASTENER ATTACHING A COMPONENT TO A PANEL

FIELD OF THE INVENTION

The present invention relates to a fastener for attaching a component to a panel and more particularly provides an insert that mounts within an oversized elongated aperture of the panel for receiving a stud attached to the component.

BACKGROUND OF THE INVENTION

It is it is known in the automobile industry and other applications to mount a component on a panel via the use of a plurality of fasteners installed between the component and the panel.

It would be desirable to provide an improved fastener that would include an insert mounted within the oversized elongated aperture of the panel for receiving a stud attached to the component, with the insert having the ability to shift the location within the aperture as needed to accommodate any misalignment or manufacturing variation between the component and the panel.

SUMMARY OF THE INVENTION

A fastener includes an insert mounted in an oversized elongated aperture of a metal panel. The insert has a tubular body of lesser outside dimension than the aperture, and a hollow interior receiving a threaded stud projecting from the component. The tubular body has a flexible lip engaging the panel and first and second retaining fingers having first shoulders engaging the bottom surface of the panel and second shoulders engaging with opposed parallel extending sidewalls of the aperture to prevent rotation of the tubular body. First and second biasing fingers project from the tubular body to engage opposed curved end walls of the aperture to a bias the tubular body within the aperture as allowed by sliding of the second shoulders along the opposed parallel extending sidewalls. A plurality of ratchet fingers extends into the hollow interior to engage the stud when the stud is installed into the insert.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
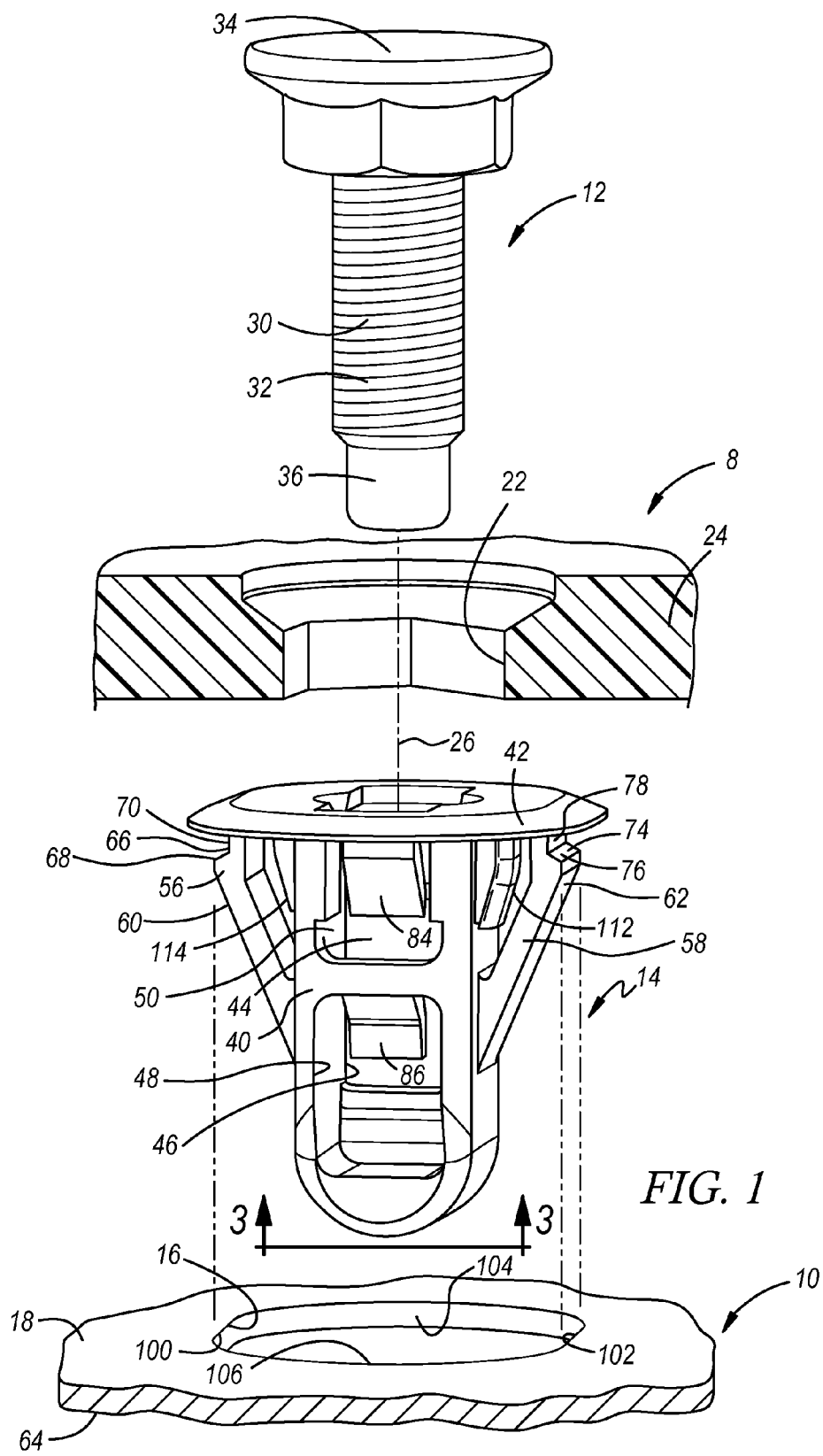
FIG. 1 is an exploded view showing a stud, a component, an insert, and a panel.

Referring to FIG. 1, a fastener is shown for mounting a component, generally indicated at 8, to a sheet metal panel, indicated generally at 10. The fastener includes a male stud, generally indicated at 12, and a female insert, generally indicated at 14. The insert 14 will be mounted in an elongated aperture 16 provided in panel 10. The stud 12 will be inserted through a hole 22 of panel 24 of the component 8. Then the component 8 will be mounted on the panel 10 by lowering the component 8 onto the panel 10 with the stud 12 being inserted into the insert 14. The axis of insertion is designated 26 in FIG. 1. The component 8 may be an air deflector that is to be mounted on the sheet metal panel 10 of a deck lid of a motor vehicle. Although the component 8 is shown herein as being of molded plastic, the component 8 can be of metallic or other construction. Likewise, although the panel 10 is described as being a sheet metal panel, the panel 10 can be a plastic panel. Panel 10 has an upper surface 18.

As seen in FIG. 1, the stud 12 includes a shank 30 having threads 32. The shank 30 has a head 34 at one end and a necked down tip 36 at the other end. The threads 32 can be helical or not helical. The stud 12 is metal or plastic and threads 32 are provided thereon.

The insert 14, is made of molded plastic and includes a tubular body 40 having a flexible lip 42 molded around its upper end. The tubular body 40 has a hollow interior 44. The tubular body 40 has side openings at 46, 48, and 50 which are provided therein to facilitate the plastic molding process for the manufacture of the insert 14. In particular, side openings 46, 48, and 50 permit the withdrawal of slides that are part of the injection mold.

Figure 3:
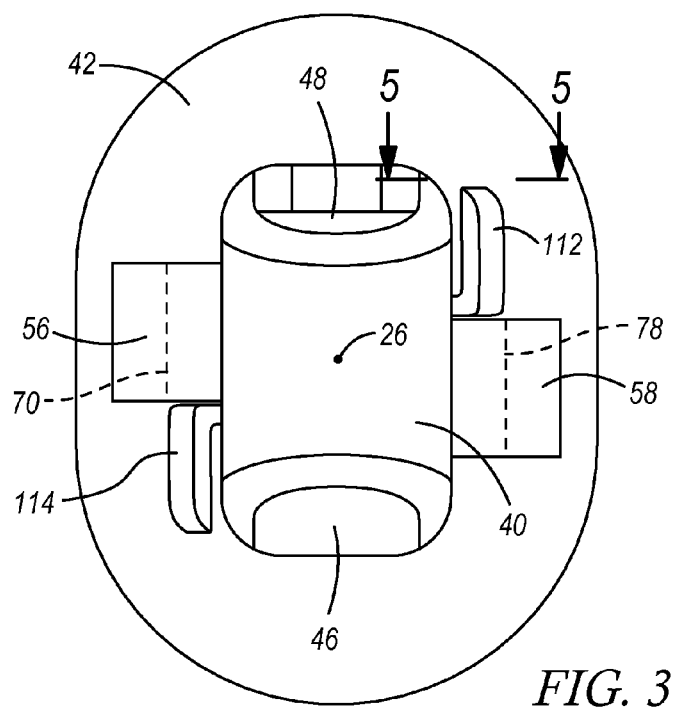
FIG. 3 is a view taken in the direction of arrows 3-3 of FIG. 1 looking upwardly at the lower end of the plastic insert.

The tubular body 40 has first and second flexible retaining fingers 56 and 58 that project outwardly at an upward angle from the closed sides of the tubular body 40. The underside of the flexible retaining fingers 56 and 58 provide ramp surfaces 60 and 62 that will cause the flexible retaining fingers 56 and 58 to be flexed when the insert 14 is installed into the elongated aperture 16 of the panel 10, as will be discussed further hereinafter. Each of the flexible retaining fingers 56 and 58 has a notch provided therein. Notch 66 of flexible retaining finger 56 defines a first shoulder 68 that will engage an underside 64 of the panel 10 and a second shoulder 70 that will engage the edge of the elongated aperture 16. Notch 74 of flexible retaining finger 58 includes a first shoulder 76 that will engage the underside 64 of the panel 10 and a second shoulder 78 that will engage the edge of the elongated aperture 16. As best seen in FIG. 3, the flexible retaining fingers 56 and 58 are diametrically opposed to one another.

Figure 9:
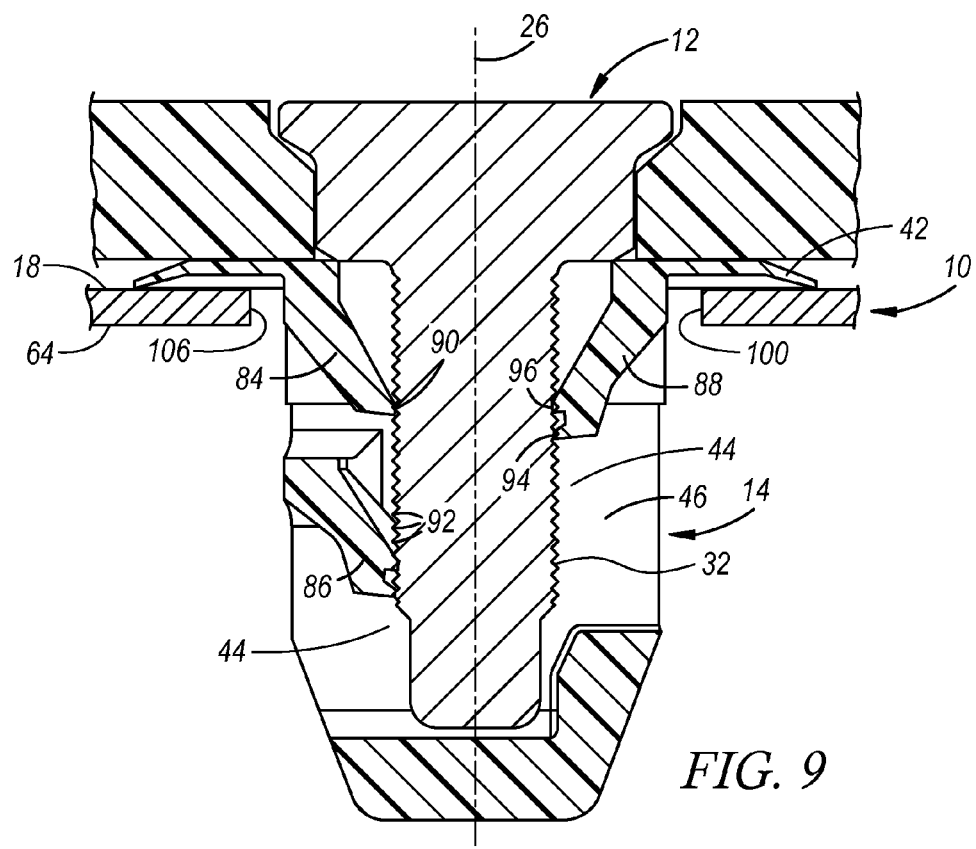
FIG. 9 is a section view taken in the direction of arrows 9-9 of FIG. 6.

Referring particularly to FIGS. 1 and 9, it is seen that the interior of the insert 14 has flexible ratchet fingers 84, 86, and 88 that project into the hollow interior 44 and have teeth for ratcheting engagement with the threads 32 of the stud 12. Ratchet fingers 84 and 86 extend at a downward angle into the hollow interior 44 from one side of the tubular body 40. The ratchet fingers 84 and 86 are spaced from one another along the axis 26 of the insert 14. The ratchet finger 88 extends at a downward angle into the hollow interior 44 from the other side of the tubular body 40. As seen in FIG. 9, the ratchet finger 88 is located intermediate the ratchet fingers 84 and 86 along the axis 26 of the insert 14. As seen in FIG. 9, the ratchet finger 84 has a single tooth 90, the ratchet finger 86 has a plurality of teeth 92, and the ratchet finger 88 has two teeth, 94 and 96.

Figures 4, 5, 6, 7:
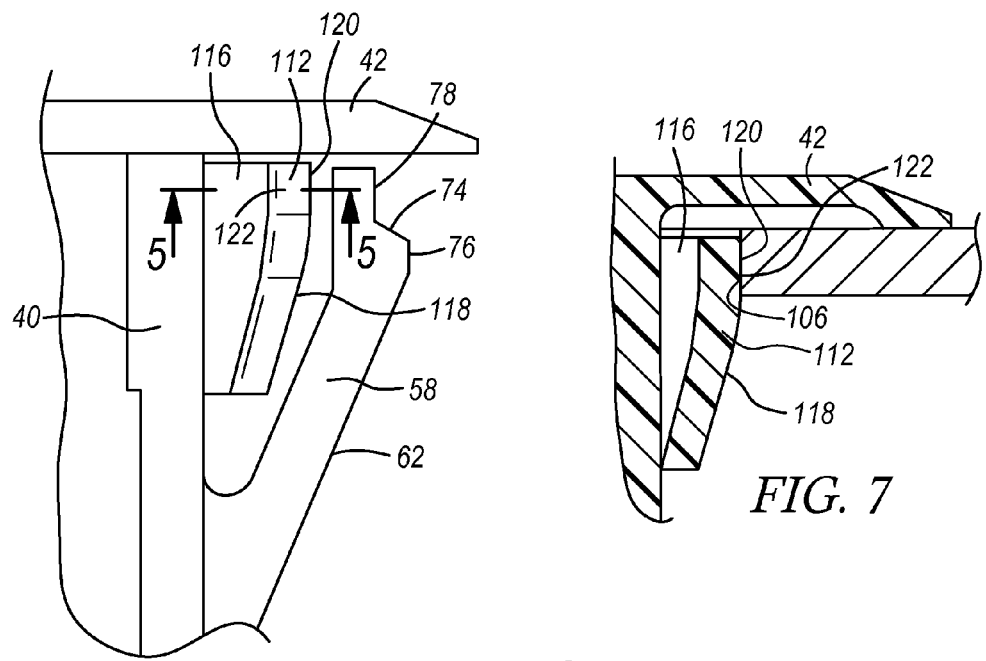
FIG. 4 is an enlargement of a fragment of the insert of FIG. 1.
FIG. 5 is a section view taken in the direction of arrows 5-5 of FIG. 4.
FIG. 6 is a view taken in the direction of the arrows 6-6 of FIG. 2 looking upwardly at the lower end of the plastic insert after the plastic insert has been mounted in an aperture of the panel.
FIG. 7 is a section view taken in the direction of arrow 7-7 of FIG. 6.

As best seen in FIGS. 1 and 6, the elongated aperture 16 includes opposed parallel extending sidewalls 100 and 102, and opposed curved end walls 104 and 106. As best seen in FIG. 6, the elongated aperture 16 and the tubular body 40 are sized relative one another, such that the elongated aperture 16 is larger than the tubular body 40, both in the lengthwise direction and the crosswise direction. In FIG. 6, the lengthwise direction is labeled L and the crosswise direction is labeled C. Accordingly, the tubular body 40 has room to shift positions in either the lengthwise direction L or the crosswise direction C within the elongated aperture 16.

Figure 2:
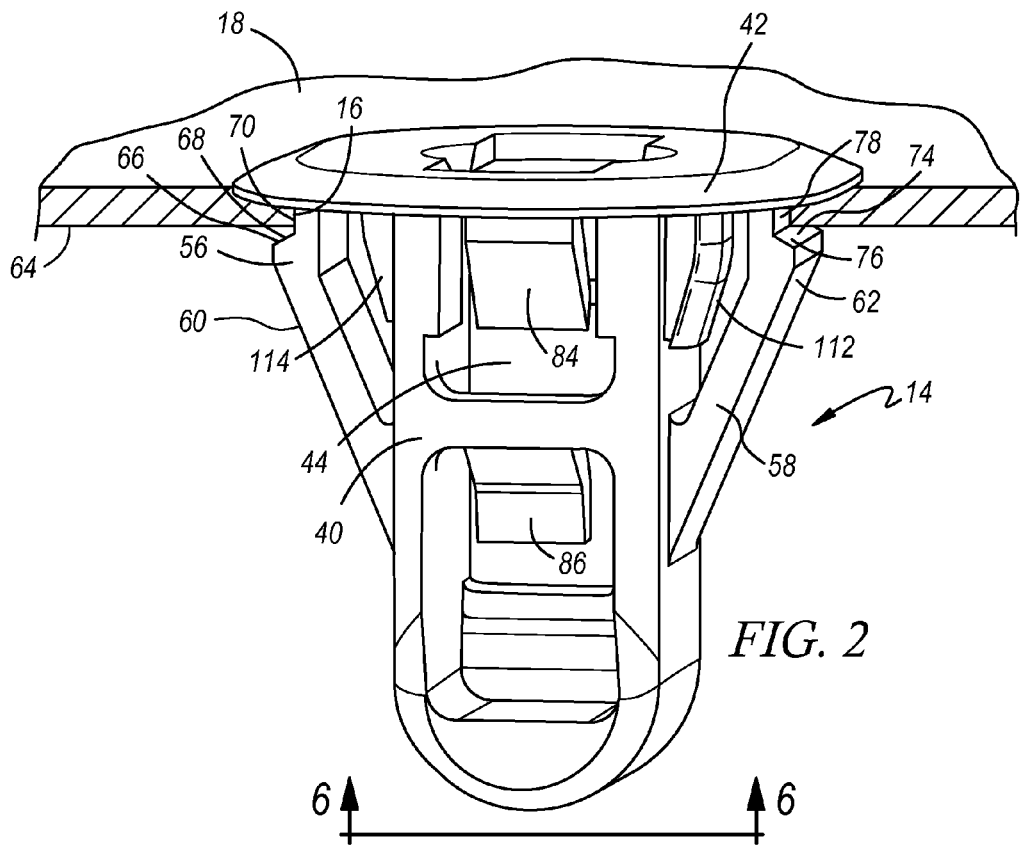
FIG. 2 is a perspective view showing the insert installed in an elongated aperture of the panel.
Figure 8:
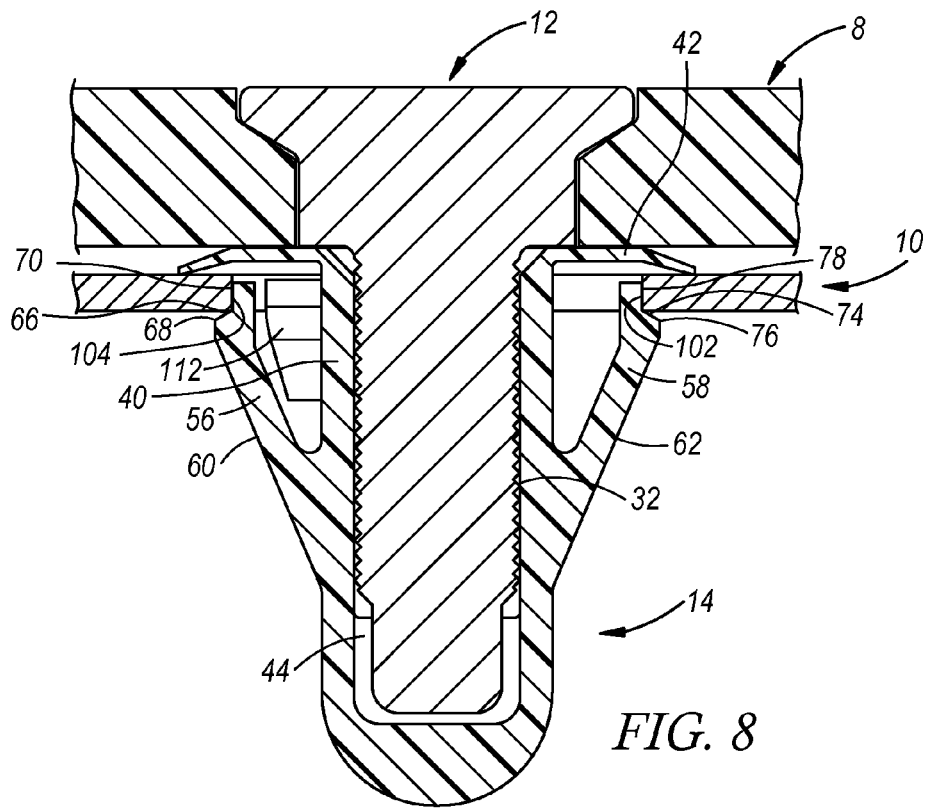
FIG. 8 is a section view taken in the direction of arrows 8-8 of FIG. 6.

Referring again to FIG. 1, it will be understood that the insert 14 will be thrust downwardly into the elongated aperture 16 of the panel 10. During the downward insertion, the ramp surfaces 60 and 62 of the flexible retaining fingers 56 and 58 will bear against the parallel walls 100 and 102, forcing the flexible retaining fingers 56 and 58 to be flexed toward one another to enable the continuing insertion of the tubular body 40 until the insertion is stopped by the flexible lip 42 engaging and flexing against the upper surface 18 of the panel 10. Upon reaching the installed position of FIGS. 2, 8, and 9, the flexible retaining fingers 56 and 58 can flex radially away from one another and the notches 66 and 74 will engage with the sheet metal panel 10. In particular, the first shoulders 68 and 76 will engage with the underside 64 of the panel 10 to prevent removal of the insert 14 upwardly from the elongated aperture 16. The second shoulders 70 and 78 will respectively engage with the opposed parallel extending sidewalls 100 and 102 of the elongated aperture 16. Because the opposed parallel extending sidewalls 100 and 102 are parallel to one another, the engagement of the second shoulders 70 and 78 therewith will fix the rotary position of the tubular body 40 within the oversize dimensions of the elongated aperture 16. Furthermore, the engagement of the first shoulders 68 and 76 with the opposed parallel extending sidewalls 100 and 102 will prevent rotation of the tubular body 40 within the elongated aperture 16.

Referring now to FIGS. 1, 3, 4, 5, 6, and 7, the insert 14 has flexible biasing fingers 112 and 114 molded integrally with and extending from the tubular body 40. FIG. 3 is a view looking upwardly at the bottom of the tubular body 40 in the direction of arrows 3-3 of FIG. 1. In FIG. 3, it is seen that the biasing finger 112 is located adjacent the flexible retaining finger 58, and the flexible biasing finger 114 is located adjacent the flexible retaining finger 56. In addition, as seen in FIG. 3, the flexible biasing fingers 112 and 114 are positioned diametrically opposite one another with respect to the longitudinal axis of insertion 26 of the tubular body 40. As seen in FIGS. 4 and 5, the flexible biasing finger 112 extends circumferentially of the tubular body 40 and includes a base leg 116 that is integral with and extends radially from the tubular body 40 to space the flexible biasing finger 112 from the tubular body 40 so that the flexible biasing finger 112 can flex radially toward and away from the tubular body. The flexible biasing finger 112 also includes an angled ramp surface 118 that extends at an angle with respect to the axis of insertion 26 of the tubular body 40, and ends at an abutment surface 120. The flexible biasing finger 112 has a rounded tip 122 at the end of the abutment surface 120.

Upon insertion of the insert 14 into the elongated aperture 16 of the panel 10, the angled ramp surface 118 of the flexible biasing finger 112 will engage with the panel 10 and cause the flexible biasing finger 112 to flex radially inwardly toward the tubular body 40, as seen in FIGS. 5 and 6. Then, when the insert 14 reaches its fully installed position of FIG. 2, the rounded tip 122 of the abutment surface 120 of the flexible finger 112 will be engaging with the curved end wall 106 of the elongated aperture 16, as seen in FIGS. 6 and 7. The flexible finger 114 is identical with the flexible biasing finger 112 and has a similar abutment surface with rounded tip 122 that will engage with the curved end wall 104 of the elongated aperture 16. The flexible biasing fingers 112 and 114 will provide a bias on the insert 14 causing the tubular body 40 of insert 14 to be established in an assured position within the oversized elongated aperture 16.

In a typical use of the aforedescribed attachment, for example in an automobile body, a plurality of these fasteners will be used to attach a component to a panel 10. For example, in the case of an air deflector mounted on a rear deck lid, as many as three, four, or six of these fasteners may be employed. It will be understood that the aforedescribed fastener will facilitate the use of a plurality of such fasteners because the inserts 14 have the ability to self-locate themselves within the oversized elongated apertures 16 of the panel 10. In particular, as the studs 12 are inserted into the hollow interior 44, studs 12 will engage with the flexible ratchet fingers 84, 86, and 86 causing the tubular body 40 to be shifted lengthwise or crosswise within the oversized aperture 16. During the shifting movement caused by the incoming stud 12, the engagement of the shoulders 70 and 78 of the flexible retaining fingers 56 and 58 will prevent the tubular body 40 from rotating but permit the tubular body 40 to slide along the opposed parallel extending walls 100 and 102 in the lengthwise direction L. Meanwhile, the flexible biasing fingers 112 and 114 will continue to bear against the curved end walls 104 and 106 and can flex and yield to accommodate movement of the tubular body 40 either lengthwise or crosswise within the oversize elongated in aperture 16.

In view of the foregoing it is seen that the invention has provided a new and improved fastener comprised of a stud and an insert, and more particularly in which the insert is designed to be movable and self-locating within an oversized aperture of a sheet metal panel, thereby accommodating manufacturing variations and enabling efficient and reliable assembly of a component onto the panel.

What is claimed is:

1. A fastener for attaching a component to a panel having top and bottom surfaces and an elongated aperture with opposed parallel sidewalls and opposed curved end walls, comprising:

a stud extending from the component and having teeth displayed along the length of the stud; and, an insert mounted in the elongated aperture, said insert having:

a tubular body of lesser outside dimension than the dimensions of the elongated aperture and having a hollow interior for receiving the stud;

a flexible lip for engaging the top surface of the panel;

first and second flexible retaining fingers projecting from the tubular body for attaching the tubular body to the panel, each finger having a first shoulder engaging with the bottom surface of the panel and cooperating with the flexible lip to mount the insert against removal from the panel, and a second shoulder engaging with one of the opposed parallel sidewalls of the elongated aperture to prevent rotation of the tubular body within the elongated aperture;

a plurality of flexible biasing fingers projecting from the tubular body to engage with the opposed curved end walls of the elongated aperture to bias the tubular body to a centered position within the elongated aperture upon the installation of the tubular body into the elongated aperture;

and a plurality of ratchet fingers provided on the tubular body and extending into the hollow interior to engage with the teeth of the stud when the stud is installed into the insert, the plurality of ratchet fingers provided on the tubular body and extending into the hollow interior to engage with the teeth of the stud when the stud is installed into the insert including a single flexible ratchet finger extending into the hollow interior from one side of the tubular body and a pair of axially spaced apart flexible ratchet fingers extending into the hollow interior from the other side of the tubular body.

2. The fastener of claim 1 further comprising the flexible biasing fingers of the insert being disposed on the tubular body diametrically opposite one another with respect to the axis of insertion of the insert.

3. The fastener of claim 1 further comprising the flexible biasing fingers of the insert having a base leg integrally molded with the tubular body, a ramp surface engaging with the panel upon insertion of the insert into the elongated aperture to flex the flexible biasing finger, and an abutment surface for engaging with the curved end wall of the elongated aperture.

4. The fastener of claim 1 further comprising the flexible biasing fingers of the insert being disposed on the tubular body diametrically opposite one another with respect to the axis of insertion of the insert, and each of the flexible biasing fingers of the insert having a base leg integrally molded with the tubular body, a ramp surface engaging with the panel upon insertion of the insert into the elongated aperture to flex the flexible biasing finger, and an abutment surface for engaging with the curved end wall of the elongated aperture.

5. A fastener for attaching a component to a panel having top and bottom surfaces and an elongated aperture with opposed parallel sidewalls and opposed curved end walls, comprising:
a stud extending from the component and having teeth displayed along the length of the stud; and,
an insert mounted in the elongated aperture, said insert having:
a tubular body of lesser outside dimension than the dimensions of the elongated aperture and having a hollow interior for receiving the stud;
a flexible lip for engaging the top surface of the panel;
first and second flexible retaining fingers projecting from the tubular body for attaching the tubular body to the panel, each finger having a first shoulder engaging with the bottom surface of the panel and cooperating with the flexible lip to mount the insert against removal from the panel, and a second shoulder engaging with one of the opposed parallel sidewalls of the elongated aperture to prevent rotation of the tubular body within the elongated aperture;
a plurality of flexible biasing fingers projecting from the tubular body to engage with the opposed curved end walls of the elongated aperture to bias the tubular body to a centered position within the elongated aperture upon the installation of the tubular body into the elongated aperture; each of the flexible biasing fingers having an abutment surface having a rounded tip engaging one of the opposed curved end walls of the elongated aperture;
and a plurality of ratchet fingers provided on the tubular body and extending into the hollow interior to engage with the teeth of the stud when the stud is installed into the insert.

6. The fastener of claim 5 further comprising the plurality of ratchet fingers provided on the tubular body and extending into the hollow interior to engage with the teeth of the stud when the stud is installed into the insert including a single flexible ratchet finger extending into the hollow interior from one side of the tubular body and a pair of axially spaced apart flexible ratchet fingers extending into the hollow interior from the other side of the tubular body.

7. The fastener of claim 6 further comprising said single ratchet finger being positioned axially intermediate the pair of axially spaced apart flexible ratchet fingers extending into the hollow interior from the one side.

8. The fastener of claim 5 further comprising the flexible biasing fingers of the insert being disposed on the tubular body diametrically opposite one another with respect to the axis of insertion of the insert.

9. A fastener for attaching a component to a panel having top and bottom surfaces and an elongated aperture with opposed parallel sidewalls and opposed curved end walls, comprising:
a stud extending from the component and having teeth displayed along the length of the stud; and,
an insert mounted in the elongated aperture, said insert having:
a tubular body of lesser outside dimension than the dimensions of the elongated aperture and having a hollow interior for receiving the stud;
a flexible lip for engaging the top surface of the panel;
first and second flexible retaining fingers projecting from the tubular body for attaching the tubular body to the panel, the first and second retaining fingers being diametrically opposed and each retaining finger having a first shoulder engaging with the bottom surface of the panel and cooperating with the flexible lip to mount the insert against removal from the panel, and each retaining finger having a second shoulder engaging with one of the opposed parallel sidewalls of the elongated aperture to prevent rotation of the tubular body within the elongated aperture;
first and second flexible biasing fingers projecting from the tubular body adjacent to the first and second retaining fingers, said first and second flexible fingers being diametrically opposite one another and engaging with the opposed curved end walls of the elongated aperture to bias the tubular body to a centered position within the elongated aperture upon the installation of the tubular body into the elongated aperture;
and a plurality of ratchet fingers provided on the tubular body and extending into the hollow interior to engage with the teeth of the stud when the stud is installed into the insert, said plurality of ratchet fingers including a single ratchet finger extending into the hollow interior from one side of the tubular body and a pair of axially spaced apart flexible ratchet fingers extending into the hollow interior from the other side of the tubular body, said single ratchet finger being positioned intermediate the pair of axially spaced apart flexible ratchet fingers extending into the hollow interior from the one side.

10. The fastener of claim 9 further comprising the flexible biasing fingers of the insert having a base leg integrally molded with the tubular body, a ramp surface engaging with the panel upon insertion of the insert into the elongated aperture to flex the flexible biasing finger, and an abutment surface for engaging with the curved end wall of the elongated aperture.

11. The fastener of claim 10 further comprising the abutment surface of the flexible biasing finger having a rounded tip engaging the curved end wall of the elongated aperture.

12. A fastener for attaching a component to a panel having top and bottom surfaces and an elongated aperture with opposed parallel sidewalls and opposed curved end walls, comprising:
- a stud extending from the component and having teeth displayed along the length of the stud; and,
- an insert mounted in the elongated aperture, said insert having:
  - a tubular body of lesser outside dimension than the dimensions of the elongated aperture and having a hollow interior for receiving the stud;
  - a flexible lip for engaging the top surface of the panel;
  - first and second flexible retaining fingers projecting outwardly at an upward angle from the tubular body for attaching the tubular body to the panel, each of the first and second flexible retaining fingers having a first shoulder engaging with the bottom surface of the panel and cooperating with the flexible lip to mount the insert against removal from the panel, and a second shoulder engaging with a respective one of the opposed parallel sidewalls of the elongated aperture to prevent rotation of the tubular body within the elongated aperture;
  - first and second flexible biasing fingers projecting from the tubular body to engage with the opposed curved end walls of the elongated aperture to bias the tubular body to a centered position within the elongated aperture upon the installation of the tubular body into the elongated aperture, each of said flexible biasing fingers extending circumferentially of the insert and having a base leg integrally molded with the tubular body and extending radially from the tubular body to space the flexible biasing finger from the tubular body so that the flexible biasing finger can flex radially toward and away from the tubular body, each of the flexible biasing fingers having a ramp surface engaging with the respective opposed curved end walls panel upon insertion of the insert into the elongated aperture to flex the flexible biasing finger, and each of the flexible biasing fingers ending at an abutment surface, said abutment surface having a rounded tip for engaging with the respective curved end wall of the elongated aperture to bias the insert to the centered position within the oversized elongated aperture of the panel;
- and a plurality of ratchet fingers provided on the tubular body and extending into the hollow interior to engage with the teeth of the stud when the stud is installed into the insert.

13. The fastener of claim 12 further comprising the plurality of ratchet fingers provided on the tubular body and extending into the hollow interior to engage with the teeth of the stud when the stud is installed into the insert including a single flexible ratchet finger extending into the hollow interior from one side of the tubular body and a pair of axially spaced apart flexible ratchet fingers extending into the hollow interior from the other side of the tubular body.

14. The fastener of claim 13 further comprising said single ratchet finger being positioned axially intermediate the pair of axially spaced apart flexible ratchet fingers extending into the hollow interior from the one side.

15. The fastener of claim 13 further comprising the flexible biasing fingers of the insert being disposed on the tubular body diametrically opposite one another with respect to the axis of insertion of the insert.

* * * * *